E. B. ALLEN.
LOADING APPARATUS.
APPLICATION FILED OCT. 7, 1918.
1,381,780.
Patented June 14, 1921.
3 SHEETS—SHEET 1.
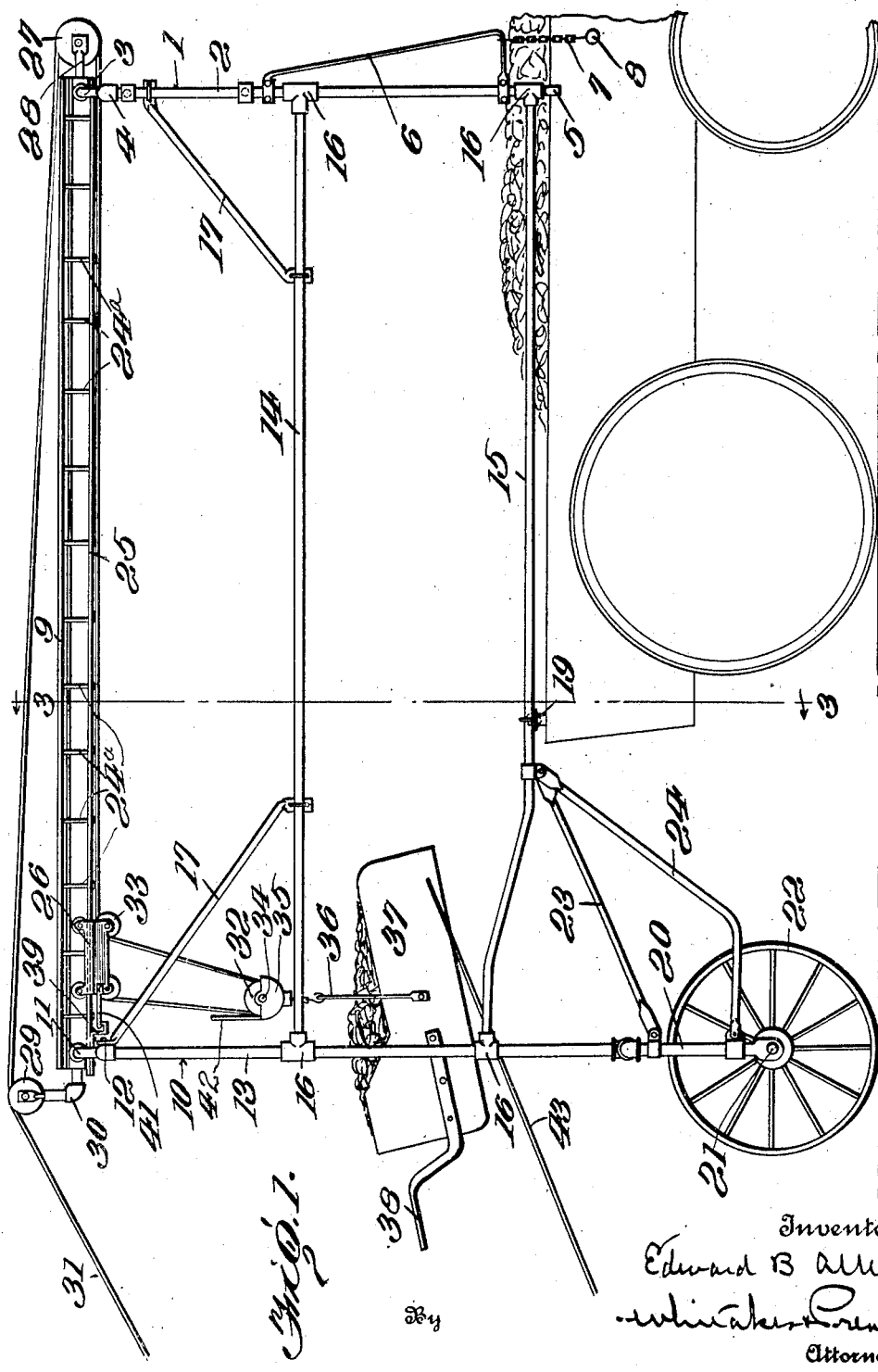
Inventor
Edward B Allen.
By
Attorneys E. B. ALLEN.
LOADING APPARATUS.
APPLICATION FILED OCT. 7, 1918.
1,381,780.
Patented June 14, 1921.
3 SHEETS—SHEET 2.
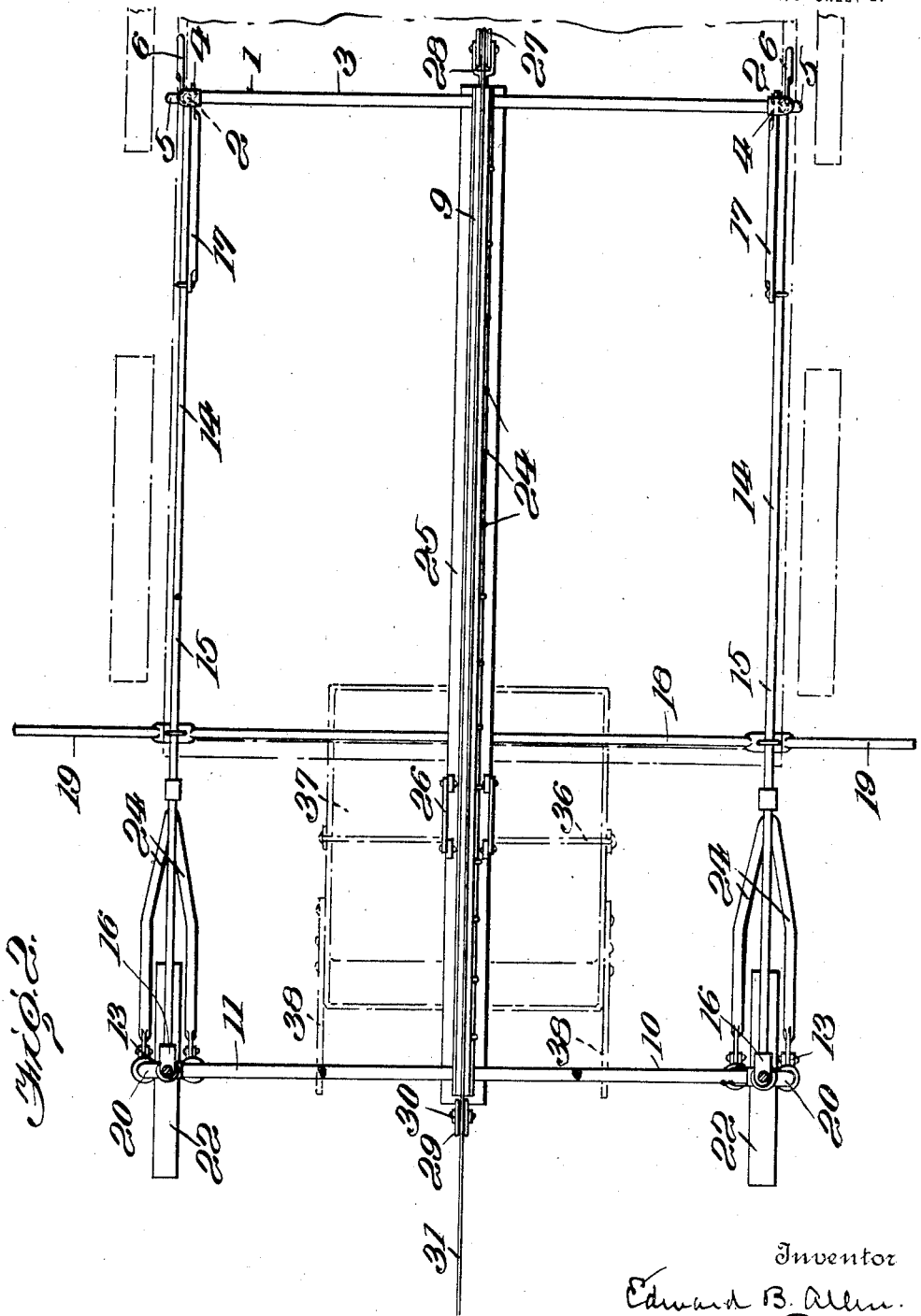

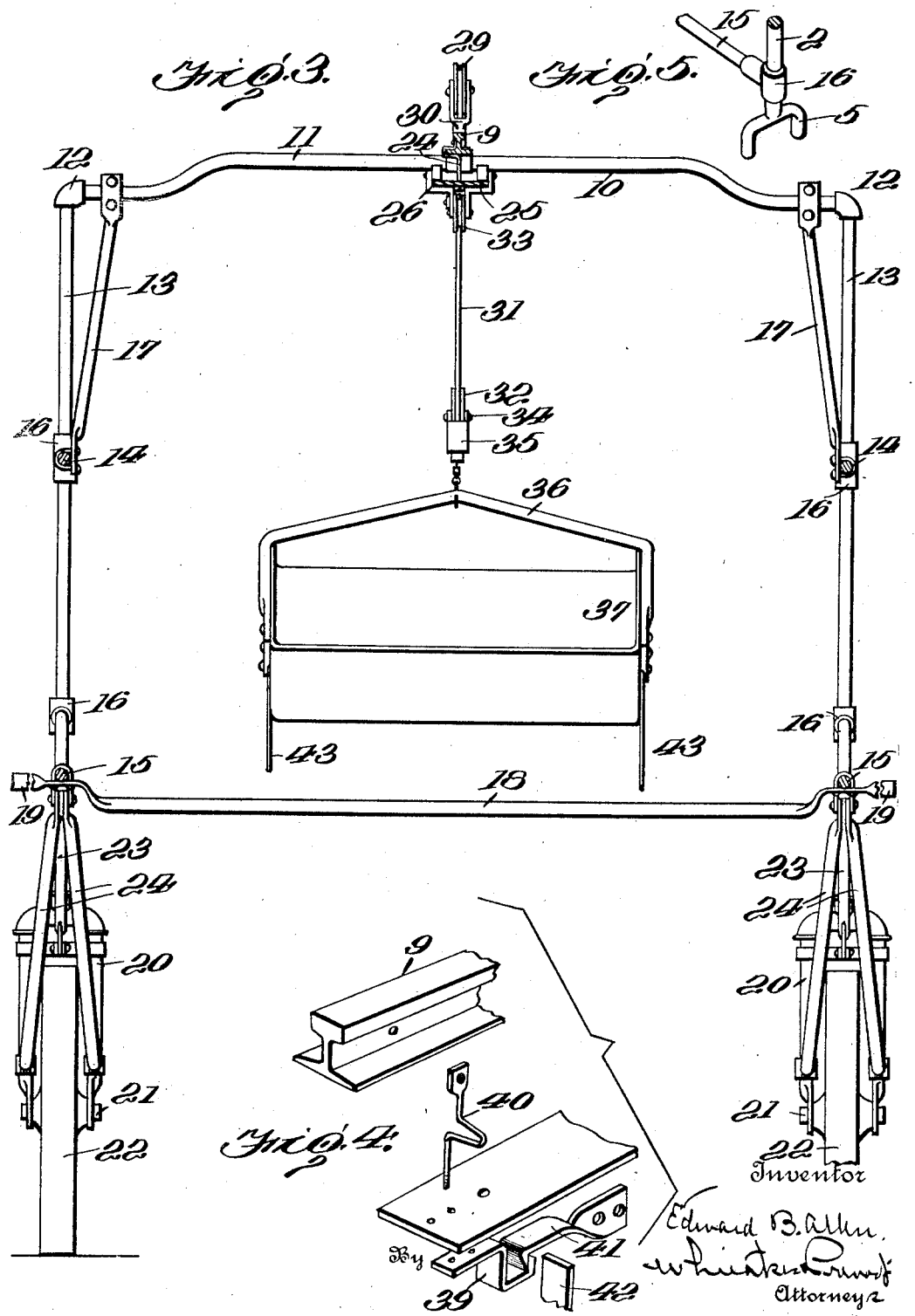

UNITED STATES PATENT OFFICE.

EDWARD B. ALLEN, OF ALEXANDRIA, LOUISIANA.

LOADING APPARATUS.

1,381,780.      Specification of Letters Patent.      Patented June 14, 1921.

Application filed October 7, 1918. Serial No. 257,246.

*To all whom it may concern:*

Be it known that I, EDWARD B. ALLEN, a citizen of the United States, residing at Alexandria, in the county of Rapides and State of Louisiana, have invented certain new and useful Improvements in Loading Apparatus; and I do hereby declare the following to be a full, clear, and exact description of the invention, such as will enable others skilled in the art to which it appertains to make and use the same.

This invention relates to improvements in means for loading wagons and the like, and is particularly directed to an improved apparatus for use in loading manure into wagons or trucks.

One of the objects of my invention is to provide an apparatus of the above character, which may be quickly detached from one vehicle and readily attached to another, so that the apparatus may be used with a number of vehicles. In this manner, one vehicle can be loaded while the other vehicles are transporting the loaded material or returning for a new load.

A further object is to provide an apparatus having a frame mounted on wheels or the like, so that the same may be moved from one vehicle to another with a minimum amount of effort and a maximum amount of speed.

Another object is to furnish an apparatus having automatic releasing means, which will permit the loading scoop or shovel to travel toward the front of the vehicle after it has been elevated to the proper height.

Still another object of the invention is to provide a loading apparatus of simple and inexpensive construction, which may be made of stock material, and which can be quickly and easily repaired when necessary.

With the foregoing objects outlined and with other objects in view, which will appear as the description proceeds, the invention consists in the novel features hereinafter described in detail in connection with the accompanying drawings, and more particularly pointed out in the appended claims.

Referring to the drawings:—

Figure 1 is a side view of my improved apparatus.

Fig. 2 is a top plan view.

Fig. 3 is a vertical sectional view taken on line 3—3 of Fig. 1.

Fig. 4 is a detail showing the trigger latch and the manner of attaching the same to the frame.

Fig. 5 is a detail perspective view of one of the saddles used in attaching the apparatus to a vehicle body.

In the drawings, 1 designates an inverted U-shaped frame forming the front of the apparatus and consisting of two vertical side bars 2 connected together at their upper ends by a horizontal cross bar 3. The connection between the bars is formed by L-shaped couplings 4 into which the ends of the bars are screwed. The lower ends of the side bars terminate in saddles 5 (shown in detail in Fig. 5) which when the apparatus is attached to a vehicle body, rest on the upper edge of the body to aid in securing the apparatus to the vehicle. Brackets 6 extend from the bars 2 and chains 7 are carried by these brackets and have loops 8 for use in connecting the chains to the body.

The cross bar 3 is secured to and carries the front end of a longitudinally extending beam 9, the rear end of said beam being carried by an inverted U-shaped frame 10 forming the rear of the apparatus. The rear frame consists if a horizontal cross bar 11 connected by L-shaped couplings 12 to vertical side bars 13. Longitudinally extending side bars 14 and 15 are secured to couplings 16 carried by the side bars 2 and 13, and braces 17 connect the vertical side bars with the longitudinal side bars for the purpose of strengthening the structure. A cross bar 18 connects the intermediate portion of the side bars 15 and rests on the rear of the wagon body when the apparatus is in use. This cross bar terminates in handles 19, which are used in handling the apparatus.

Secured to the lower ends of the bars 13 are forks 20 carrying axles 21 upon which are mounted wheels 22, which move with the vehicle to which the apparatus is attached, and which are utilized in changing the apparatus from one vehicle to another. Braces 23 and 24 connect the forks to the longitudinal side bars 15.

The beam 9 carries a series of suspended hangers 24ª, which support a track plate 25 upon which is movably mounted a carriage 26. A front pulley 27 is carried by a support 28, which extends from the cross bar 3 and a rear pulley 29 is mounted in a fork 30 which extends from the bar 11. A cable or rope 31 has one of its ends secured to the carriage 26, passes around a pulley 32, over a pulley 33 mounted on the carriage, and then over the pulleys 27 and 29. After leaving the pulley 29, the cable is connected to any suitable power means (not shown) for moving the cable. The pulley 32 is fulcrumed on an axle 34 carried by a casing 35 and this casing is connected to the bail 36 of a shovel or scoop 37, having operating handles 38.

The carriage 26 normally rests at the rear of the apparatus, as shown in Fig. 1, and it is retained in this position by a latch 39 secured to the plate 25 by means of a hanger 40 and coöperating with a trigger 41 attached to the carriage. The trigger is operated by a post 42 extending upwardly from the casing 35.

A rope 43 is connected to the forward part of the scoop and is used in dumping the same and for returning the scoop to the rear of the apparatus.

In operation, the free end of the rope 31 is attached to either a motor operated winding drum or to a horse. Then the operator grasps the handles 38 and as the rope is wound up or moved away from the vehicle, the scoop 37 will be drawn toward the vehicle. If the scoop is held in contact with the ground, it will gather the material to be loaded, as it moves toward the vehicle. When the scoop reaches the vehicle, it will be elevated and as soon as it is raised the proper distance, the post 42 will strike the trigger 41 and cause it to release the latch 39, and the carriage 26 and scoop will then travel forward over the vehicle to the point where the scoop is to be dumped. The scoop is dumped by pulling on the cord 43, which causes the tipping of the scoop. After the scoop is dumped, the scoop is pulled by the operator back to the latch 39, and the trigger being formed of resilient metal, will automatically engage the latch. The scoop is then lowered and drawn away from the vehicle the necessary distance to gather another load. Then the foregoing operation is continued until the vehicle is loaded.

After loading one vehicle, the chains 7 are detached from the vehicle and the handles 19 are grasped by the operators and the apparatus is then wheeled to another vehicle to which it is attached, as shown in Fig. 1.

The foregoing description is illustrative of a practical form of the invention and I am aware that various changes and modifications may be made in the structure without departing from the spirit of the invention or sacrificing any of its advantages.

What I claim and desire to secure by Letters Patent is:—

1. The combination with a vehicle body, of a loading apparatus including an inverted U-shaped rear frame having side bars provided at their lower ends with forks, wheels mounted in said forks and supporting the rear frame, an inverted U-shaped front frame having side bars provided at their lower ends with saddles adapted to rest on the side bars of the vehicle body, substantially horizontal bars having their ends rigidly connected to said frames and spacing the same apart, means detachably securing the side bars of the front frame to the vehicle body, a gathering device adapted to gather the material to be loaded into said body, and means supported by said frames and attached to said gathering device for moving said gathering device toward the vehicle body.

2. A combination as defined in claim 1 in which a transverse bar is connected to a plurality of said horizontal bars and rests on the upper edge of the vehicle body, the end portions of the transverse bars terminating in handles to facilitate attaching and detaching the loading apparatus to the vehicle body.

In testimony whereof do I affix my signature.

EDWARD B. ALLEN.